United States Patent

[11] 3,604,203

| | | | |
|---|---|---|---|
| [72] | Inventor | Detlef Hofmann | |
| | | Kieselbronn, Germany | |
| [21] | Appl. No. | 769,019 | |
| [22] | Filed | Oct. 21, 1968 | |
| [45] | Patented | Sept. 14, 1971 | |
| [73] | Assignee | Rodi & Wienenberger Aktiengesellschaft | |
| | | Pforzhein, Germany | |
| [32] | Priority | Oct. 28, 1967 | |
| [33] | | Germany | |
| [31] | | P 15 57 633.9 | |

[54] LINK BRACELET
10 Claims, 4 Drawing Figs.

[52] U.S. Cl..................................................... 59/80,
59/90, 63/4
[51] Int. Cl...................................................... F16g 13/00
[50] Field of Search................................... 59/80, 82, 90, 78;
63/4

[56] References Cited
UNITED STATES PATENTS
3,323,325  6/1967  Meyer........................... 63/4

| 1,173,427 | 2/1916 | Hayman...................... | 59/78 |
| 1,214,135 | 1/1917 | Clark........................... | 59/80 |
| 1,440,230 | 12/1922 | Mestekin..................... | 59/80 |
| 2,536,007 | 12/1950 | Miner.......................... | 59/80 |
| 2,539,891 | 1/1951 | Carr............................. | 59/80 |
| 2,661,228 | 12/1953 | Wilson......................... | 59/80 |
| 2,702,451 | 2/1955 | Schwaibold................. | 59/80 |

Primary Examiner—Charles W. Lanham
Assistant Examiner—Gene P. Crosby
Attorney—Jacobs & Jacobs ABSTRACT: A link bracelet is formed which comprises a plurality of links flexibly connected to one another by connection means which comprises a projection extending from the end of each link and a mating recess disposed near the other end of each link so that the projections can mate with the recesses in adjacent links and means for securing the projection in the recess while permitting flexibility of the bracelet.

PATENTED SEP 14 1971 3,604,203

INVENTOR.
DETLEF HOFFMANN
BY Jacobs & Jacobs
ATTORNEYS

LINK BRACELET

The present invention is concerned with flexible nonextensible link bracelets and the individual links which make up such bracelets. Such link bracelets are used both ornamentally and for utilitarian purposes and such bracelets often contain various decorations on the surfaces which have made the use of links bent of sheet blanks unsuitable because of their thin walls and predisposition to breakage and cracking.

In particular, surfaces of link bracelets are often decorated through the use of diamond tools and, therefore, solid metal links are required for certain types of bands. The surfaces of such bands are often finished by diamonds and the linkage in such bracelets must meet the following criteria in order to be suitable for commercial and industrial production:

1. The manufacture and mounting of solid links must be economical and must be capable of being accomplished on automated machines;
2. The links must be flexibly connected in the direction of the wrist;
3. The links should have a straight expansion joint only, transverse to the linkage, which will show the least possible gap when the bracelet is bent; and
4. The addition or removal of links must be a simple procedure so that the bracelet may be sized for the wearer by the simple addition or removal of links and not require manufacture to such requirements.

The link bracelet and the links according to the present invention represent an advance in the art since they easily and economically accomplish all of the above four criteria whereas known links and link bracelets consisting of solid links, up to the present time, have not been capable of meeting these criteria.

According to the present invention, a link is formed for use in a link bracelet which comprises a prismatic four-sided member having two longitudinal sides, a top side and a bottom side. One longitudinal side forms an acute angle with the top side. A profile stem which has a length shorter than the length of the four-sided member and having a rounded hinge axis at its free end is attached to said member by a collar bar. Each link has a blind-end bore at one longitudinal side of the member and a slot opening the bore to the longitudinal side.

A plurality of these prismatic links may be flexibly connected to one another by mating the projection from one link with the recess of an adjacent link and securing said projection in said recess by suitable means such as pins or setscrews. It may be advantageous to secure some adjacent links with setscrews while securing other adjacent links with pins.

More particularly, the projections used to secure the links to one another are worked out of the link at one longitudinal edge of the prismatic and solid link and these projections which have the shape of a profile stem are shorter in length than the length of the link itself. The bore is disposed transverse to the longitudinal direction of the bracelet which is opened to the longitudinal edge by a slot so that the collar bar of the profile stem of the adjacent link extends through the slot and its hinge axis is pivotably restorable in the bore in the direction of the wearer's wrist. The bore which is open at the bracelet seam will then be closed through the use of the aforesaid pins or set screws which secure the links to one another and prevent them from accidentally becoming loose. The links according to the present invention can be easily milled, bored, cut and mounted from rod stock on an automatic machine so that the linkage can be easily produced using solid links.

The present invention is more particularly illustrated by reference to the accompanying drawings wherein.

Figure 1:
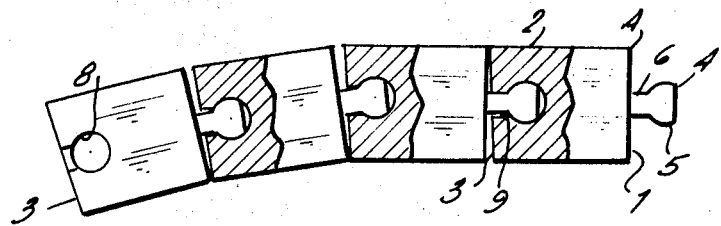
FIG. 1 is a fragmented side view of a section of a link bracelet formed according to the present invention.

With reference to the drawings, the link bracelets according to the present invention including the individual links making up the bracelet and the linkage of adjacent links is formed by prismatic links A, A' which lie transverse to the longitudinal direction of the bracelet, each link having a longitudinal side 1, 1' extending to top side 2, 2' in a rectangular manner and longitudinal side 3, 3' forms an acute angle with top side 2, 2' in order to enable a mutual bending of the links A, A' in the direction of the wearer's wrist. A profile stem 4 is milled to the center of the height of the link at one longitudinal side 1 of link A. The profile stem 4 is shorter in length than the length of link A and has a round hinge axis 5 at its free end and which is preferably flattened at the off side of the link. At the side facing the link, the round hinge axis 5 graduates in a flat collar bar 6 which is thinner than the cross section of hinge axis 5 and forms a firm connection between hinge axis 5 and link a. Close to the other longitudinal side 3 of link A is a recess such as a blind-end bore 8 which is disposed at one longitudinal edge 7 transverse to the longitudinal direction of the bracelet provided with a milled slot 9 which extends toward the longitudinal side 3. The profile stem 4 of an adjacent link A is inserted into the blind-end bore 8 laterally from the longitudinal edge 7 of the band so that the round hinge axis 5 is disposed in blind-end bore 8 and collar-bar 6 extends through slot 9.

In this manner, two adjacent links A are connected to one another without play in the longitudinal direction of the band. The collar-bar 6 is lower than the height of slot 9 thereby providing a minimal pivotal action of hinge axis 5 within the blind-end bore 8 with the result that links A can be mutually bent in the direction of the wrist of the wearer.

Because profile stems 4 are shorter in length than the length of the links, it is possible to provide pins 10 which secure the stem into the bore 8 and such pins are set in place from the longitudinal edge 7 and thereby prevent separation of the links A when stress is exerted on the bracelet transverse to its longitudinal direction. In place of pins 10, setscrews 11 may be used, or a combination of the two, whereby some links are connected with one another by pins 10 while others are connected to one another by setscrews 11. This arrangement provides for the simple addition or removal of links as desired so that the finished bracelet will provide a suitable fit around the wrist of the wearer.

Figure 2:
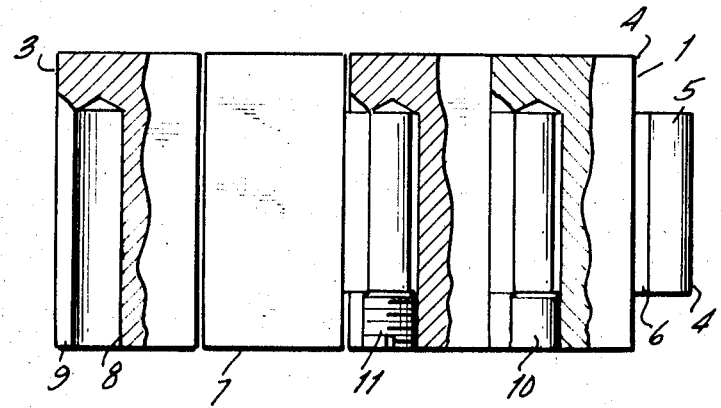
FIG. 2 is a plan view of the section of FIG. 1.
Figure 3:
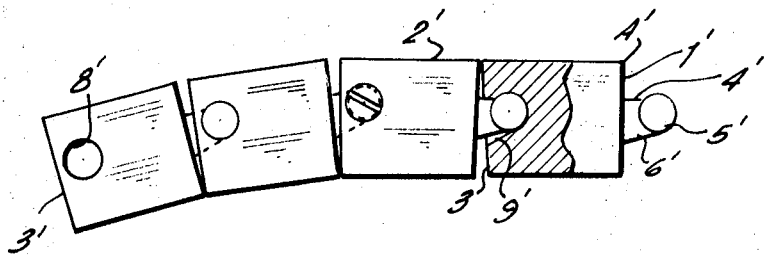
FIG. 3 is a fragmented side view of a second embodiment according to the present invention and shows a similar section to that of FIG. 1.
Figure 4:
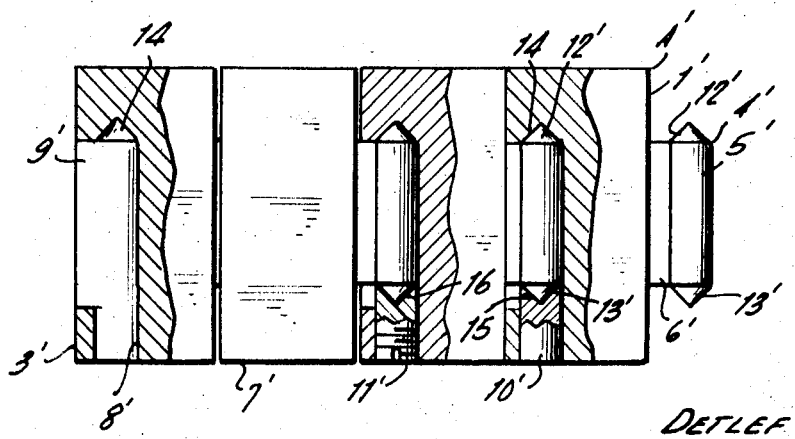
FIG. 4 is a plan view of the section of FIG. 3.

FIGS. 3 and 4 illustrate a second embodiment of the present invention wherein, as mentioned above, the links are designated A', one longitudinal side is 1', the profile stem is 4', the hinge axis is 5' and a collar-bar is 6'. In this alternate embodiment, the hinge axis 5' is preferably set above the center of the height of the link. This embodiment produces smaller joints when the links A' are bent. Both ends 12' and 13' of hinge axis 5' are conically tapered and project beyond the sides of collar bar 6'. Close to the other longitudinal side 3', there is a recess or blind-end bore 8' which has conical points 14 at the same degree of angle of conical points 12' and 13' of hinge axis 5'. Longitudinal side 3' forms an acute angle with top side 2' as indicated in the embodiment of FIGS. 1 and 2.

A longitudinal slot 9' extends for blind-end bore 8' disposed in the longitudinal side 3' of links A' and is inclined upwards from the plane of the bracelet, thereby opening blind-end bore 8' to the longitudinal side 3'. This longitudinal slot 9' has the same height as the cross section of hinge axis 5' and of a length which permits the hinge axis 5' of an adjacent link A' to be inserted into the blind-end bore 8' from the longitudinal side 3' of link A. As a result of this structure, conical end 12' of hinge axis 5' is disposed within the conical point 14' of the blind-end bore 8' and a pin 10' is placed into the blind-end bore 8' from the longitudinal edge 7' of the bracelet having a conical recess 15 at its end and which fits into the other conical end 13' of hinge axis 5'. Thus any tension which is exerted on the linkage will be supported mainly by the conical ends 12', 13' of hinge axis 5'. The point 14 of the blind-end bore 8' and the recess 15 of pin 10' simultaneously constitute the turning support of hinge axis 5'.

As is the case with the embodiment illustrated in FIGS. 1 and 2, setscrews 11' can be used in place of pins 10' and these have the same conical recesses 16 at their ends. In addition, if desired, some links may be connected to the adjacent links by pins 10' and other links may be connected to adjacent links by set screws 11'.

Other and further uses and modifications of the present invention will be appreciated by those skilled in the art.

What is claimed is:

1. A link for use in a link bracelet comprising a prismatic four-sided member having two longitudinal sides, a top side and a bottom side, one longitudinal side forming an acute angle with the top side, a profile stem integral with said member and extending from a longitudinal side, shorter in length than said longitudinal side and having a rounded hinge axis conically tapered, a collar-bar connecting the profile stem and the member in an integral manner, a blind-end bore in the longitudinal side of said member opposite that from which the profile stem extends and a slot opening said bore to said longitudinal side.

2. A link bracelet which comprises a plurality of prismatic solid links, each link having two longitudinal sides, a top side and a bottom side, one longitudinal side forming an acute angle with the top side, a profile stem integral with each link and extending from a longitudinal side, a collar bar which connects said profile stem and said link in an integral manner through a hinge axis, said profile stem being shorter in length than the longitudinal side from which it extends, a blind-end bore in the longitudinal side of the link opposite that from which the profile stem extends, a slot opening said bore to said longitudinal side and means for securing each profile stem inside the blind-end bore of the adjacent link.

3. A link bracelet according to claim 2 wherein the securing means is a pin.

4. A link bracelet according to claim 2 wherein the securing means is a setscrew.

5. A link bracelet according to claim 2 wherein the securing means comprises pins disposed in some blind-end bores and setscrews disposed in others.

6. A link bracelet according to claim 2 wherein the ends of the profile stem are conically tapered and extend beyond each side of collar-bar.

7. A link bracelet according to claim 6 wherein the blind-end bore has conical points to mate with the conically tapered ends of the profile stem.

8. A link bracelet according to claim 7 wherein the securing means is a pin.

9. A link bracelet according to claim 7 wherein the securing means is a setscrew.

10. A link bracelet according to claim 7 wherein the securing means comprises pins disposed in some blind-end bores and setscrews disposed in others.